United States Patent
Meinert et al.

(10) Patent No.: US 12,505,374 B2
(45) Date of Patent: Dec. 23, 2025

(54) QUANTUM COMPUTING DEVICE, USE, AND METHOD

(71) Applicant: Universität Stuttgart, Stuttgart (DE)

(72) Inventors: Florian Meinert, Herrenberg (DE); Tilman Pfau, Sindelfingen/Darmsheim (DE); Christian Hölzl, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 359 days.

(21) Appl. No.: 18/267,066

(22) PCT Filed: Dec. 6, 2021

(86) PCT No.: PCT/EP2021/084363
§ 371 (c)(1),
(2) Date: Jun. 13, 2023

(87) PCT Pub. No.: WO2022/128565
PCT Pub. Date: Jun. 23, 2022

(65) Prior Publication Data
US 2024/0311672 A1    Sep. 19, 2024

(30) Foreign Application Priority Data
Dec. 15, 2020   (EP) .................................... 20214187

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC ......... G06N 10/40; G06N 10/20; B82Y 10/00
See application file for complete search history.

(56) References Cited

U.S. PATENT DOCUMENTS 10,504,033 B1   12/2019   King et al.

FOREIGN PATENT DOCUMENTS

| CN | 110401492 A | 11/2019 |
| WO | 2019/014589 A1 | 1/2019 |

OTHER PUBLICATIONS

T. Topcu et al. Possibility of triple magic trapping of clock and Rydberg states of divalent atoms in optical lattices. J. Phys. B: At. Mol. Opt. Phys. 49 (2016) 144004 (10pp). DOI 10.1088/0953-4075/49/14/144,004 (Year: 2016).*

(Continued)

*Primary Examiner* — Collin X Beatty
(74) *Attorney, Agent, or Firm* — Shook, Hardy & Bacon L.L.P.

(57) ABSTRACT

The invention relates to a quantum computing device comprising at least one atom, wherein the at least one atom has a first electronic state, a second electronic state, and a third electronic state, wherein the third electronic state is a Rydberg electronic state, and an optical capture device configured to emit electromagnetic radiation to capture one or more of the at least one atom, wherein the optical capture device is configured to emit the electromagnetic radiation at a capture wavelength, wherein the first electronic state, the second electronic state, and the Rydberg electronic state have a substantially equal AC polarizability for the capture wavelength. The invention further relates to a use of a quantum computing device and a method for quantum computing.

14 Claims, 6 Drawing Sheets

(56) References Cited

OTHER PUBLICATIONS

T. Topcu et al. Divalent Rydberg atoms in optical lattices: Intensity landscape and magic trapping. Physical Review A 89, 023411 (2014). (Year: 2014).*

First Office Action issued in Chinese Application No. 202180084144.8, mailed May 17, 2025.

Christian Hölzl; "Towards High n Circular Rydberg States in Ultracold Atomic Gases"; University of Stuttgart, Master's Thesis; Oct. 22, 2019.

International Search Report issued in corresponding International Application No. PCT/EP2021/08436, mailed Mar. 29, 2022.

Written Opinion issued in corresponding International Application No. PCT/EP2021/08436, mailed Mar. 29, 2022.

* cited by examiner

QUANTUM COMPUTING DEVICE, USE, AND METHOD

CROSS-REFERENCE TO RELATED APPLICATIONS AND PRIORITY CLAIM

This U.S. Patent Application is a 371 U.S. National Stage patent application of PCT International Application PCT/EP2021/084363, titled "QUANTUM COMPUTING DEVICE, USE, AND METHOD" with an international filing date of 6 Dec. 2021, which claim priority to European Patent Application No. 20214187.5, filed on 15 Dec. 2020, and titled "Quantum Computing Device, Use, and Method," the contents of which are incorporated herein by reference in their entirety.

The invention concerns a quantum computing device, a use of a quantum computing device, and a method for quantum computing.

The invention lies in the field of quantum computing, specifically in the field of quantum computing using neutral atoms. In particular, conventional quantum computing systems are based on the use of ionic qubits or superconducting qubits, for which entanglement of over 50 qubits as well as fidelities for 2-qubit operations of 99.5% (SPAM corrected) has recently been shown.

It is therefore an object of the invention to provide a quantum computing device having improved operational characteristics.

At least the above object is solved by a quantum computing device, a use of a quantum computing device, and a method for quantum computing having the features of the independent claims, respectively. Preferred embodiments form the subject of the dependent claims.

One aspect relates to a quantum computing device, comprising at least one atom, wherein the at least one atom has a first electronic state, a second electronic state, and a third electronic state, wherein the third electronic state is a Rydberg electronic state, and an optical capture device configured to emit electromagnetic radiation to capture one or more of the at least one atom, wherein the optical capture device is configured to emit the electromagnetic radiation at a capture wavelength, wherein the first electronic state, the second electronic state, and the Rydberg electronic state have a substantially equal AC polarizability for the capture wavelength. Such a capture wavelength may also be referred to as a magic capture wavelength.

The at least one atom may comprise any number of atoms. The at least one atom may comprise one species of atoms or a plurality of species of atoms. In other words, the at least one atom may comprise only atoms of a single element and/or isotope or may comprise atoms of a plurality of elements and/or isotopes. The at least one atom may for example comprise at least one alkaline earth metal atom and/or at least one lanthanide atom. The at least one atom may comprise at least one strontium atom and/or at least one ytterbium atom. In particular, some atoms, such as for example strontium and ytterbium, provide narrow laser cooling transitions, which allow a strong suppression of thermal dephasing. However, the disclosure is not restricted to such a selection of atoms. In particular, any species and/or isotopes of atoms may be used, provided a suitable capture wavelength can be calculated, for which the first electronic state, the second electronic state, and the Rydberg electronic state have a substantially equal AC polarizability.

The at least one atom may comprise at least one neutral atom. In particular, neutral atoms, specifically neutral atoms of the same element, are identical so that a corresponding qubit frequency of a qubit on the basis of such neutral atoms is substantially the same for each of such qubits. Thereby, a reduction of control system complexity, which may otherwise be required to address heterogeneous qubits, can be achieved. The at least one atom may be cooled, preferably laser cooled. In particular, the at least one atom may be cooled to a temperature within a range of micro-Kelvin, preferentially for example to a temperature within a range of between 1 mK to 0.01 mK. Furthermore, the at least one atom may, after being captured by the optical capture device, be further cooled to bring the at least one captured atom into the lowest quantum mechanical vibrational state of the corresponding optical trap generated by the electromagnetic radiation emitted by the optical capture device in order to reduce and/or prevent thermal dephasing. In particular, the quantum computing device may further comprise a further cooling unit configured to perform said further cooling of the at least one atom, wherein the further cooling unit may for example be configured to further cool the at least one atom by sideband cooling.

Such sideband cooling may in particular use the above-mentioned narrow laser cooling transitions.

The quantum computing device may further comprise an atom reservoir, wherein the atom reservoir comprises a plurality of the at least one atom. The atom reservoir may further comprise at least one cooling unit, such as a laser cooling unit, to cool the plurality of the at least one atom. The atom reservoir may be configured to provide the at least one atom to the optical capture device. In particular, the atom reservoir may be configured to generate a cold atom beam of the at least one atom directed towards the optical capture device. The quantum computing device may further comprise an intermediate trap device, wherein the intermediate trap device comprise one or more magneto-optical traps (MOT) configured to trap the at least one atom of the cold atom beam. Furthermore, the intermediate trap device may further be configured to provide the at least one trapped atom to the optical capture device. In particular, the optical capture device may be configured to capture the at least one atom from the at least one atom trapped in the intermediate trap device. Therefore, it is possible to provide an efficient supply of atoms to the optical capture device to be captured. In particular, the atom reservoir may be configured as a replaceable and/or refillable cartridge.

The first electronic state may be a first fine structure electronic state. The second electronic state may be a second fine structure electronic state. The first electronic state and the second electronic state may be electronic states of the same electronic orbital. The first fine structure electronic state and the second fine structure electronic state may be fine structure electronic states of the same electronic orbit, such as for example the $^3P$-orbital of a corresponding atom. In such a case, the first electronic state may be a $^3P_0$ electronic state and the second electronic state may be a $^3P_2$ electronic state, wherein the $^3P_0$ electronic state and the $^3P_2$ electronic state form a long-lasting pair of electronic states. However, the disclosure is not to be interpreted as being limited to such examples, wherein for example other long-lasting pairs of electronic states may be used.

The third electronic state may be a Rydberg electronic state. In particular, the third electronic state may be an electronically exited state with energies that follow the Rydberg formula as they converge on an ionic state with an ionization energy of a corresponding atom. In particular, the third electronic state may be an electronically excited state having a high principal quantum number. In particular, the principal quantum number may be at least 20, preferentially at least 40, and may be at most 150, preferentially at most 100.

In particular, Rydberg electronic states may be sensitive to electric fields and to neighbouring atoms also having a Rydberg electronic state. Therefore, an interaction between two Rydberg atoms may be strong and scale with $n^{11}$, wherein n is the principal quantum number. In such a case, the interaction may achieve values of up to approximately 100 MHZ at separations of approximately 10 micrometres. Furthermore, a lifetime of Rydberg electronic states may grow with the principal quantum number and may reach values of up to and over 100 microseconds.

However, using an optical capture device as described herein, a coherence time of a corresponding qubit may be further increased to above 10 milliseconds and more, allowing for new algorithmic approaches to quantum computing. Furthermore, using an optical capture device as described herein, it may be possible to capture the at least one atom such that the first electronic state, the second electronic state, and the third electronic state (Rydberg electronic state) are captured. This is in contrast to, for example, at least some alkali atoms having one electron in the outer shell where at least the third electronic state may not also be captured, which may result in the atom being lost while being in the Rydberg electronic state.

In particular, each of the captured one or more atoms may correspond to a single qubit. Each qubit may comprise the two states |0> and |1>, wherein |0> and |1> denote the first and second electronic state.

In particular, by using such a first electronic state, second electronic state, and third electronic state, a coherence time of the corresponding qubit may be significantly increased, such as for example up to and beyond 10 milliseconds. Furthermore, such significantly increased coherence times allow for a spatial rearrangement and/or a geometric changing of one or more qubits, even during and/or inbetween an execution of an algorithm and/or qubit gate operation by the quantum computing device. In particular, by enabling a rearrangement and/or geometric changing of one or more qubits, it may be possible to realise gates with more than two qubits, which are called N-qubit gates. Furthermore, by enabling a rearrangement and/or geometric changing of one or more qubits, it may also be possible to significantly increase the connectivity between qubits. Therefore, new quantum-algorithmical possibilities may exist by providing a dynamically adjustable quantum computational architecture.

The optical capture device is configured to emit electromagnetic radiation at the capture wavelength. In particular, the capture wavelength is a specific wavelength, at which the first electronic state, the second electronic state, and the third electronic state have substantially the same AC polarizability when exposed to said emitted electromagnetic radiation. In other words, the emitted electromagnetic radiation generates a trap potential, wherein the first electronic state, the second electronic state, and the third electronic state each experience substantially the same trap potential when exposed to the emitted electromagnetic radiation. Substantially the same trap potential may be understood in this case such that the experienced trap potential by each of the first electronic state, the second electronic state, and the third electronic state when exposed to the emitted electromagnetic radiation differs by at most approx. h×100 Hz (wherein h is Planck's constant), preferentially at most approx. h×75 HZ, further preferentially at most approx. h×50 Hz. In particular, for typical trap potentials (e.g. approx. 1 mK temperature equivalent), the AC polarizability of the first electronic state, the second electronic state, and the third electronic state when exposed to said emitted electromagnetic radiation may differ by at most approx. $10^{-4}$, preferentially by at most approx. $10^{-5}$, further preferentially by at most approx. $10^{-6}$.

In particular, the trap potential experienced by an electronic state when exposed to corresponding electromagnetic radiation may be calculated. Therefore, by performing corresponding calculations, it may be possible to determine the capture wavelength and corresponding electronic states for a given species and/or isotope of atom. In particular, said calculations may be based on standard calculations of atomic physics, and may require several input parameters, such as for example state energies and/or state widths, some or all of which may be obtained by measurement or electronic structure calculations. Furthermore, the calculations to determine the capture wavelength may require the tunability of the magic capture wavelength for the qubit itself, wherein a wavelength of the corresponding electromagnetic radiation, e.g. laser light, and the polarizability, e.g. the laser polarizability, may be corresponding control variables for said tunability. In other words, the calculations to determine the capture wavelength of a corresponding qubit and/or atom may comprise a determination that said capture wavelength is polarization dependent.

The quantum computing device may further comprise a Rydberg excitation unit configured to emit at least one Rydberg excitation beam. In particular, the Rydberg excitation unit may be configured to emit the at least one Rydberg excitation beam at two or more captured atoms to switch an interaction therebetween on and off. Such switching may be achieved within nanoseconds. Specifically, it may therefore be possible to entangle and/or remove entanglement of a plurality of the one or more captured atoms within very short timeframes. In particular, if the at least one atom comprises at least one strontium atom, the Rydberg excitation unit may be configured to emit at least one Rydberg excitation beam having a wavelength of 317 nm and/or 323 nm. The Rydberg excitation unit may comprise a Rydberg laser configured to emit the at least one Rydberg excitation beam. The Rydberg excitation unit may be configured to directly emit the at least one Rydberg excitation beam at the two or more captured atoms or may be configured to emit the at least one Rydberg excitation beam at the two or more captured atoms using one or more optical elements, such as optical guides and/or mirrors. The Rydberg excitation unit may be configured to cause direct 1-photon coupling of the first electronic state and the second electronic state to the third electronic state. Therethrough, it may be possible to implement rapid Rydberg gates having strongly suppressed heat rates in comparison to conventional 2-photon coupling.

The quantum computing device may further comprise a Raman coupling unit, wherein the Raman coupling unit is configured to emit at least two Raman laser beams. The Raman coupling unit may be configured to superimpose the at least two Raman laser beams into one combined Raman laser beam. The Raman coupling unit may comprise at least one Raman laser. The Raman coupling unit may be configured to emit the at least two Raman laser beams at the at least one captured atom. In particular, if the at least one atom comprises at least one strontium atom, the Raman coupling unit may be configured to emit at least two Raman laser beams having a wavelength of 679 nm and 707 nm. The Raman coupling unit may be configured to emit the at least two Raman laser beams directly at the one or more captured atoms or may be configured to emit the at least two Raman laser beams at the one or more captured atoms using one or more optical elements, such as optical guides and/or mirrors.

The Raman coupling unit may be configured emit the at least two Raman laser beams to execute at least one single atom gate using far-detuned Raman coupling within 10 nanoseconds. The Raman coupling unit may be configured emit the at least two Raman laser beams at each of the at least one captured atom, wherein the Raman coupling unit may be configured emit the at least two Raman laser beams sequentially and/or in parallel (for example by fanning out the at least two Raman beams into a plurality of Raman beams) at the at least one captured atom.

In particular the at least one Raman laser and/or the at least one Rydberg laser may have a phase stability of smaller than 15 Hz, preferentially smaller than 10 Hz.

The optical capture device may further comprise at least one focused laser beam unit configured to emit at least one focused laser beam, wherein the at least one focused laser beam is configured to capture the at least one atom. In particular, the at least one focused laser beam may function as at least one optical tweezer. In particular, the at least one focused laser beam may have the capture wavelength. Each focused laser beam may have a power of at least 1 mW, preferably at least 5 mW, further preferably at least 10 mW.

The at least one focused laser beam unit may comprise a laser light source configured to emit at least one electromagnetic radiation beam, wherein the laser light source may comprise at least one laser. The at least one focused laser beam unit may be configured to emit electromagnetic radiation at one or more wavelengths and/or frequencies, such as in particular at the capture wavelength. The laser light source may emit at least one electromagnetic radiation beam of at least 0.01 W, preferable at least 1 W, further preferably at least 10 W. The laser light source may have a line width of approximately 10 Hz to 10 KHz. The laser light source may be frequency doubled.

The at least one focused laser beam unit may further comprise an acousto-optical modulator array, wherein the acousto-optical modulator array may comprise at least one acousto-optical modulator and/or at least one acousto-optical deflector. The acousto-optical modulator array may be configured to at least partially receive and diffract the at least one electromagnetic radiation beam to form at least one intermediate beam. Each acousto-optical modulator and/or acousto-optical deflector may be configured to form the corresponding at least one intermediate beam as a row of substantially equally spaced and/or substantially parallel beams. Each acousto-optical modulator and/or acousto-optical deflector may additionally or alternatively be configured to form the corresponding at least one intermediate beam as a row of variable spaced beams, wherein the variably spaced beams may form beam sub-groups of closer spaced beams compared to other beams of the respective row of variably spaced beams, wherein each acousto-optical modulator and/or acousto-optical deflector may be configured to control a beam spacing of the row of variably spaced beams. Two or more acousto-optical modulators and/or two or more acousto-optical deflectors may be arranged such that their respectively generated rows of beams intersect, preferably at right angles, respectively. The acousto-optical modulator array may comprise at least two, preferentially at least five, further preferred at least 10, further preferred at least 20 acousto-optical modulators and/or acousto-optical deflectors. In particular, the at least one acousto-optical modulator and/or the at least one acousto-optical deflector may be configured to be controlled separately or in combination. In particular, the at least one acousto-optical modulator and/or the at least one acousto-optical deflector may be controlled by a multitone RF-signal having a center frequency of for example approx. 80 MHz to form the at least one intermediate beam. In particular, the at least one acousto-optical modulator and/or the at least one acousto-optical deflector may be controllable by the multitone RF-signal such that one intermediate beam is formed for each RF component of the multitone RF-signal. In particular, the at least one acousto-optical modulator and/or the at least one acousto-optical deflector may be controllable by the multitone RF-signal such that a direction of the at least one formed intermediate beam may be determined and/or changed by the corresponding RF components of the multitone RF-signal.

However, the disclosure is not to be interpreted as being limited to acousto-optical modulators and/or acousto-optical deflectors. In particular, other optical elements may be used instead and/or in parallel to said acousto-optical modulators, such as for example electro-optic modulators, piezo mirrors, micro-electro-mechanical devices, and/or spatial light modulators.

The at least one focused laser beam unit may further comprise an additional scanning optics unit, wherein the additional scanning optics unit may be configured to, preferentially dynamically, adjust the direction of the at least one intermediate beam. In particular, the additional scanning optics unit may for example comprise a plurality of mirrors, wherein a position and a tilt of the plurality of mirrors may be changeable to adjust the direction of the at least one intermediate beam.

The at least one focused laser beam unit may further comprise focussing optics, wherein the focussing optics may be configured to focus the at least one intermediate beam to form the at least one focused laser beam. In particular, the focussing optics may comprise a microscope. However, other means of focusing the at least one intermediate beam to form the at least one focused laser beam may additionally or alternatively be used.

The optical capture device may further be configured to capture the at least one atom at positions of a two-dimensional or three-dimensional array. The atoms may be captured such that a separation between neighbouring atoms in the two-dimensional or three-dimensional array is approximately 10 micrometres. In particular, the atoms may be captured such that a separation between neighbouring atoms in the two-dimensional or three-dimensional array is at least approximately 1 micrometre, preferentially at least approximately 2 micrometres, and at most approximately 15 micrometres, preferably at most approximately 10 micrometres. In particular, a maximum separation between said neighbouring atoms may be determined depending on a reduction in strength of the corresponding Rydberg interaction and therefore slow gate times over increasing separations, and/or may be determined depending on a field-of-view of the focussing optics. A minimum separation between said neighbouring atoms may be determined depending on the bandwidth of the at least one acousto-optical modulator and/or the at least one acousto-optical deflector, and/or may be determined depending on the resolution of the focussing optics. Furthermore, the optical capture device may be configured to capture one atom with each one of the at least one focused laser beam. Alternatively, the optical capture device may be configured to capture at least a minimum number of atoms with the at least one focused laser beam. The optical capture device may be configured to adjust the position of one or more captured atoms, such as for example by adjusting the direction of the at least one intermediate beam by adjusting one or more RF components of the multitone RF-signal, as described above. In particular, it may therefore be possible to adjust the position of one or more captured atoms within a timescale of less than approx. 100 microseconds. In particular, it may therefore be possible to provide an improved and efficient capturing process. Preferentially, at least 10, further preferentially at least 50, further preferentially at least 100, further preferentially at least 500 atoms may be captured, preferably substantially simultaneously, at positions of the two-dimensional or three-dimensional array.

The optical capture device may be configured to adjust the position of one or more captured atoms at a maximum shift speed of for example at most approximately 1 micrometre per 10 microseconds. In particular, a timescale for the maximum shift speed may be determined by the harmonic oscillation frequency of an atom captured by the optical capture device, wherein such a harmonic oscillation frequency may for example be of the order of 100 KHz. In particular, a length scale for the maximum shift speed may be determined by a size or cross-sectional diameter of the at least one focused laser beam, wherein such a cross-sectional diameter may be of the order of 1 micrometre. In particular, by implementing such a maximum shift speed, it may be possible to ensure that a captured atom is not lost during adjustment of its position.

The quantum computing device may be further configured to adjust a spatial position of the one or more captured atoms to form at least one single-qubit gate and/or at least one two-qubit gate and/or at least one multi-qubit gate. In particular, the optical capture device may be configured to adjust the spatial position of the one or more captured atoms, and the Raman coupling unit and/or the Rydberg excitation unit may be configured to adjust a state of entanglement between the one or more captured atoms to form the at least one single-qubit gate and/or the at least one two-qubit gate and/or the at least one multi-qubit gate. Furthermore, each two-qubit gate and/or multi-qubit gate may comprise at least one qubit and at least one control qubit. For example a (2+1) qubit gate may comprise two qubits and one control qubit. Furthermore, complex calculations and/or logical gates, such as CNOT gates, may be implemented by a combination of the at least one single-qubit gate and/or the at least one two-qubit gate and/or the at least one multi-qubit gate.

In particular, the quantum computing device may be configured to adjust the spatial position of the one or more captured atoms to switch between the at least one single-qubit gate and/or the at least one two-qubit gate and/or the at least one multi-qubit gate. Therefore, the quantum computing device may be able to dynamically adjust the composition of qubit gates in the two-dimensional and/or three-dimensional array during operation of the quantum computing device.

Furthermore, by operating the optical capture device at the capture wavelength, a coherence time of the one or more captured atoms is significantly improved.

Specifically, by operating the optical capture device to emit electromagnetic radiation at the capture wavelength, a dephasing of the relative phase of all three electronic states may be minimized and thereby said coherence time may be improved. In particular, it may be possible to therewith achieve coherence times of up to any beyond 10 milliseconds. Based on such an improved coherence time, it may thus be possible to dynamically change the position and/or entanglement state of specific captured atoms while quantum computing operations are executed on the two-dimensional or three-dimensional array, such as in between gate operations. Furthermore, based on such an improved coherence time, a connectivity between qubits may also be significantly improved.

The quantum computing device may further comprise a polarization unit, wherein the polarization unit may be at least partially arranged along the path of the at least one focused laser beam, and between the at least one focused laser beam unit and the positions of the two-dimensional and/or three-dimensional array. In particular, the polarization unit may be configured to adjust a polarization state of the at least one focused laser beam. The polarization unit may for example comprise a linear polarizer and/or a circular polarizer.

The quantum computing device may further comprise a readout unit configured to determine data of the one or more captured atoms, such as for example a qubit state of a corresponding captured atom. The readout unit may comprise at least one readout laser configured to emit at least one readout beam to cause fluorescence in the one or more captured atoms. The readout unit may in particular be configured to perform a state-dependent read out of data of the qubit. In particular, if the at least one atom comprises at least one strontium atom, the existing strong transition $^1S_0$-$^1P_1$ (461 nm) of strontium may be used for causing fluorescence. Furthermore, the transition $^1S_0$-$^3P_1$ (689 nm) and the transitions $^3P_J$-$^3S_1$ (679 nm, 688 nm, 707 nm) may be used to perform a state-dependent read out of data of the qubit. Furthermore, the transition $^1S_0$-$^3P_1$ (689 nm) may be used to cool the atom during a read out of data of the qubit, wherein such a cooling may improve an efficiency of the read out of data. In particular, the at least one readout laser may comprise at least on Raman-based laser and/or the at least one Raman laser. Furthermore, the readout unit may comprise a detection unit configured to observe the caused fluorescence to read out data of the one or more captured atoms. The detection unit may comprise any type of sensor capable of detecting the caused fluorescence. In particular, the detection unit may comprise a CCD, such as for example an EMCCD camera. Specifically, it may therefore be possible to determine data of the one or more captured atoms with high fidelity, preferentially with a fidelity of at least 0.9999, preferentially with a fidelity of at least 0.99999.

One or more of the laser light source and/or the at least one readout laser and/or the laser cooling unit and/or the Raman laser and/or Rydberg laser may be implemented as a solid-state laser and/or a fibre laser. However, other types of lasers may instead or additionally be implemented. Furthermore, the laser light source and/or the at least one readout laser and/or the laser cooling unit and/or the Raman laser and/or Rydberg laser may be configured to emit coherent electromagnetic radiation. One or more of the laser light source and/or the at least one readout laser and/or the laser cooling unit and/or the Raman laser and/or Rydberg laser may be frequency doubled.

The quantum computing device may further comprise a vacuum cell, wherein the vacuum cell may be configured to substantially fully enclose at least the two-dimensional or three-dimensional array of the one or more captured atoms. The vacuum cell may be configured to hold a vacuum of less than approx. $10^{-11}$ mbar, preferentially less than approx. $10^{-12}$ mbar. In particular, vacuum-limited holding times of an atom captured by the optical capture device of at least approx. 10 seconds may therefore be possible.

In a preferential embodiment, the quantum computing device comprises at least one strontium atom, wherein the at least one strontium atom has a first fine structure electronic state $^3P_0$, a second fine structure electronic state $^3P_2$, and a Rydberg electronic state n $^3S_1$, wherein n has an exemplary value of 78, and an optical capture device configured to emit at least one focused laser beam having a capture wavelength of 596 nm to capture one or more of the at least one strontium atom, wherein the first fine structure electronic state $^3P_0$, the second fine structure electronic state $^3P_2$, and the Rydberg electronic state n $^3S_1$, wherein n has an exemplary value of 78, have a substantially equal AC polarizability for the capture wavelength of 596 nm.

One aspect relates to a use of a quantum computing device. In particular, the quantum computing device may comprise any combination of features, as discussed herein and/or shown in the figures.

One further aspect relates to a method for quantum computing, comprising a step of providing at least one atom, wherein the at least one atom has a first electronic state, a second electronic state, and a third electronic state, wherein the third electronic state is a Rydberg electronic state. The method for quantum computing further comprises a step of emitting electromagnetic radiation to capture one or more of the at least one atom, wherein the one or more atoms are captured using electromagnetic radiation at a capture wavelength, wherein the first electronic state, the second electronic state, and the Rydberg electronic state have a substantially equal AC polarizability for the capture wavelength.

In particular, the method may comprise one or more features, as discussed for the quantum computing device and/or the use of a quantum computing device above.

Figure 1:
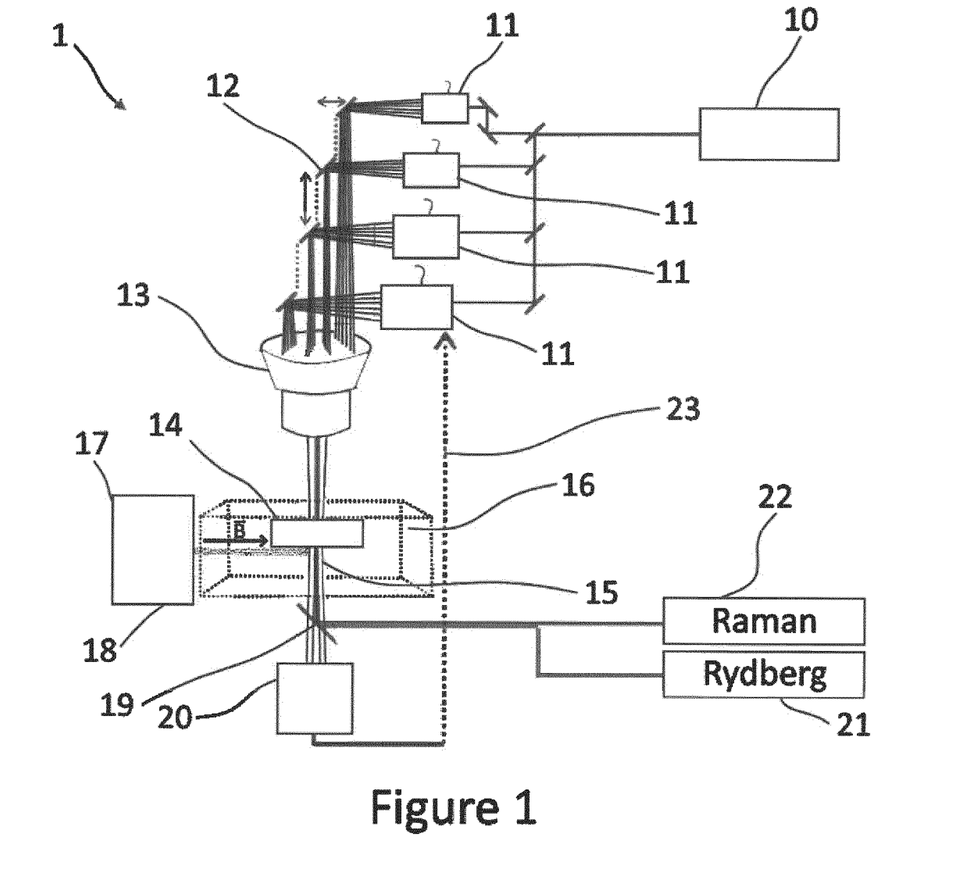
FIG. 1: A schematic overview of a quantum computing device.

The invention will be further explained using exemplary, illustrative embodiments shown in the figures. The following figures show:

FIG. 1 shows a schematic overview of an exemplary quantum computing device 1.

The quantum computing device 1 comprises at least one atom 18, which is illustrated as a cold atom beam in FIG. 1. The at least one atom 18 has a first electronic state, a second electronic state, and a third electronic state, wherein the third electronic state is a Rydberg electronic state.

In the shown embodiment, the at least one atom 18 comprises one species of strontium atoms, wherein the strontium atoms are not charged. In particular, strontium provides narrow laser cooling transitions, which allow a strong suppression of thermal dephasing.

The quantum computing device 1 further comprises an atom reservoir 17, wherein the atom reservoir 17 comprises a plurality of the at least one atom 18. The atom reservoir 17 may further comprise at least one cooling unit (not shown), such as a laser cooling unit, to cool and trap the at least one atom 18 in a magneto-optical trap. The atom reservoir 17 is configured to provide the at least one atom 18 to the optical capture device to be captured. In particular, in the shown example, the atom reservoir 17 is configured to generate a cold atom beam of the at least one atom 18 directed towards the optical capture device.

In the shown example, the first electronic state is a $^3P_0$ electronic state and the second electronic state is a $^3P_2$ electronic state, wherein the $^3P_0$ electronic state and the $^3P_2$ electronic state form a long-lasting pair of electronic states. The third electronic state is a n $^3S_1$ Rydberg electronic state, wherein n in this specific example has a value of 78.

The quantum computing device 1 further comprises an optical capture device configured to emit electromagnetic radiation to capture one or more of the at least one atom 18, wherein the optical capture device is configured to emit the electromagnetic radiation at a capture wavelength, wherein the first electronic state, the second electronic state, and the Rydberg electronic state have a substantially equal AC polarizability for the capture wavelength. In the shown example, the capture wavelength is 596 nm.

The optical capture device further comprises at least one focused laser beam unit configured to emit at least one focused laser beam, wherein the at least one focused laser beam is configured to capture the at least one atom. The at least one focused laser beam unit comprises a laser light source 10 configured to emit at least one electromagnetic radiation beam. While the at least one focused laser beam unit may be configured to emit electromagnetic radiation at one or more wavelengths and/or frequencies, such as in particular at the capture wavelength, in the shown example, the focused laser beam unit is configured to emit electromagnetic radiation at the capture wavelength only.

The at least one focused laser beam unit further comprises an acousto-optical modulator array, wherein the acousto-optical modulator array may comprise at least one acousto-optical modulator and/or at least one acousto-optical deflector 11. The exemplary acousto-optical modulator array comprises four acousto-optical deflectors 11, but more or less acousto-optical deflectors 11 may be implemented. The acousto-optical modulator array may be configured to at least partially receive and diffract the at least one electromagnetic radiation beam to form at least one intermediate beam. Each of the exemplary acousto-optical deflectors 11 is configured to form the corresponding at least one intermediate beam as a row of variably spaced beams. Furthermore, in the exemplary embodiment shown, each acousto-optical deflector 11 is configured to be controlled separately.

In particular, the at least one focused laser beam unit may further comprise a beam splitting unit arranged in the optical path of the at least one electromagnetic radiation beam between the laser light source 10 and the acousto-optical modulator array. The beam splitting unit may be configured to split the at least one electromagnetic radiation beam into a plurality of sub-beams, wherein each sub-beam is directed to one of the acousto-optical deflector 11. The beam splitting unit may in particular be configured to split the at least one electromagnetic radiation beam into a plurality of sub-beams having equal intensity. Alternatively, the beam splitting unit may in particular be configured to split the at least one electromagnetic radiation beam into a plurality of sub-beams having different intensity, wherein the beam splitting unit may be configured to adjust an intensity ratio between two or more sub-beams. The beam splitting unit may comprise a plurality of beam splitting elements, such as for example mirrors, plate beam splitters, and/or cube beam splitters.

It is noted that the beam splitting unit may be implemented in some embodiments, but may not be necessary in all embodiments. For example, if the laser light source 10 is configured to emit one electromagnetic radiation beam for each of the acousto-optical deflector 11, a beam splitting unit may not be necessary.

The at least one focused laser beam unit further comprises an optical combination unit 12, wherein the optical combination unit 12 is configured to, preferentially dynamically, adjust the direction of the at least one intermediate beam. In particular, the optical combination unit 12 may be configured to, preferentially dynamically, direct the at least one intermediate beam onto the focussing optics 13. In particular, the exemplary optical combination unit 12 may comprise a plurality of mirrors, wherein a position and a tilt of the plurality of mirrors is changeable to adjust the direction of the at least one intermediate beam. In particular, the optical combination unit 12 may comprise an array of micro mirrors and/or one or more macroscopic mirrors.

The at least one focused laser beam unit further comprises focussing optics 13, wherein the focussing optics 13 are configured to focus the at least one intermediate beam to form the at least one focused laser beam. In particular, the exemplary focussing optics 13 comprise a microscope.

The at least one focused laser beam unit may furthermore be configured such that each optical beam path from the laser light source 10 to a specific position in the two-dimensional and/or three-dimensional array 15 has substantially the same length.

The quantum computing device 1 further comprises a polarization unit 14, wherein the polarization unit 14 is arranged along the path of the at least one focused laser beam and between the at least one focused laser beam unit and positions of the two-dimensional and/or three-dimensional array 15. In particular, the polarization unit 14 is configured to adjust a polarization state of the at least one focused laser beam, such as for example by linearly polarizing said at least one focused laser beam.

The optical capture device is further configured to capture the at least one atom 18 at positions of a two-dimensional or three-dimensional array 15. Specifically, the optical capture device is configured to capture one atom 18 with each one of the at least one focused laser beam.

The quantum computing device 1 is further configured to adjust a spatial position of the one or more captured atoms 18 to form at least one single-qubit gate and/or at least one two-qubit gate and/or at least one multi-qubit gate. In particular, the optical capture device may be configured to adjust the spatial position of the one or more captured atoms 18, and the Raman coupling unit 22 and/or the Rydberg excitation unit 21 is configured to adjust a state of entanglement between the one or more captured atoms 18 to form the at least one single-qubit gate and/or the at least one two-qubit gate and/or the at least one multi-qubit gate.

The quantum computing device 1 further comprises a vacuum cell 16, wherein the vacuum cell 16 may be configured to substantially fully enclose at least the two-dimensional or three-dimensional array 15 of the one or more captured atoms 18. The vacuum cell 16 may further comprise a magnetic field module (not shown), wherein the magnetic field module may be configured to generate a magnetic field. The magnetic field may be configured to define a quantization axis for the one or more captured atoms 18. In particular, the magnetic field may be configured to have a substantially time constant direction, wherein the substantially time constant direction may have a fixed angle with a laser-polarization of the electromagnetic radiation emitted by the optical capture device.

The quantum computing device 1 further comprises a readout unit configured to determine data of the one or more captured atoms 18, such as for example a qubit state of a corresponding captured atom 18. The readout unit may comprise at least one readout laser (not shown) configured to emit at least one readout beam to cause fluorescence in the one or more captured atoms 18. Furthermore, the readout unit may comprise a detection unit 20 configured to observe the caused fluorescence to read out data of the one or more captured atoms 18. The detection unit 20 may comprise a CCD, such as for example an EMCCD camera. Furthermore, the quantum computing device 1 may further comprise a dichroic mirror element 19 arranged between the two-dimensional or three-dimensional array 15 and the detection unit 20. The dichroic mirror element 19 may be configured to allow the caused fluorescence to pass.

Furthermore, the readout unit and/or the detection unit 20 may further be configured to generate a feedback signal 23 for controlling the acousto-optical deflector 11. The feedback signal 23 may be provided to the focused laser beam unit and/or the acousto-optical modulator array and/or the acousto-optical deflector 11.

The quantum computing device 1 further comprises a Rydberg excitation unit 21 configured to emit at least one Rydberg excitation beam. In particular, the Rydberg excitation unit 21 may be configured to emit the at least one Rydberg excitation beam at two or more captured atoms 18 to switch an interaction therebetween on and off. In the particular example shown, the Rydberg excitation unit 21 is configured to emit at least one Rydberg excitation beam having a wavelength of 317 nm and/or 323 nm. The Rydberg excitation unit 21 may comprise a Rydberg laser configured to emit the Rydberg excitation beam. The Rydberg excitation unit 21 may be configured to directly emit the Rydberg excitation beam at two or more captured atoms 18 or may be configured to emit the Rydberg excitation beam at two or more captured atoms 18 using one or more intermediately arranged optical elements, such as for example the dichroic mirror element 19. The one or more intermediately arranged optical elements may in particular comprise one or more additional acousto-optical modulators and/or one or more acousto-optical deflectors, wherein the one or more additional acousto-optical modulators and/or one or more acousto-optical deflectors may be configured to adjust a position of the at least one Rydberg excitation beam relative to the two or more captured atoms 18.

The quantum computing device 1 further comprises a Raman coupling unit 22, wherein the Raman coupling unit 22 is configured to emit at least two Raman laser beams. The Raman coupling unit 22 may comprise at least one Raman laser. The Raman coupling unit 22 may be configured to emit the at least two Raman laser beams at one or more captured atoms 18. In the particular example shown, the Raman coupling unit 22 may be configured to emit at least two Raman laser beams having a wavelength of 679 nm and/or 707 nm. The Raman coupling unit 22 may be configured to directly emit the Raman laser beams at the one or more captured atoms 18 or may be configured to emit the Raman laser beams at the one or more captured atoms 18 using one or more intermediately arranged optical elements, such as for example the dichroic mirror element 19. The one or more intermediately arranged optical elements may in particular comprise one or more additional acousto-optical modulators and/or one or more acousto-optical deflectors, wherein the one or more additional acousto-optical modulators and/or one or more acousto-optical deflectors may be configured to adjust a position of the at least two Raman laser beams relative to the two or more captured atoms 18.

Figure 2:
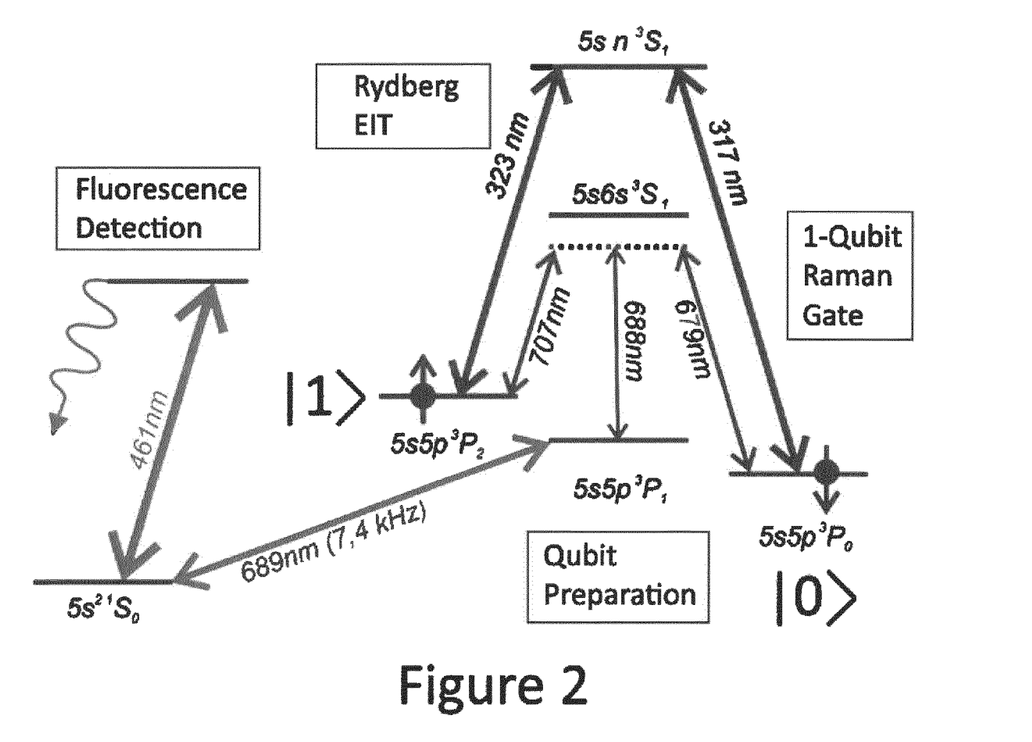
FIG. 2: A schematic overview over different states of a strontium atom, as used in the exemplary embodiment shown in FIG. 1.

FIG. 2 shows a schematic overview over different states of a strontium atom, as used in the exemplary embodiment shown in FIG. 1. In particular, the first electronic state $^3P_0$ and second electronic state $^3P_2$ are illustrated. Said states may be coupled to the n $^3S_1$ Rydberg state via resonant 1-photon coupling, as illustrated, to allow 2-qubit and multi-qubit gates. Furthermore, said states may be coupled to the $^3S_1$ state via a rapid Raman process to allow 1-qubit operations. A combined Rydberg-Raman scheme and standard Raman scheme in between different qubits permits the use of several protocols based on, for example, Rydberg dressing, Rydberg EIT, and controlled STIRAP. Furthermore, a readout of the shown exemplary qubit may be performed over the transition $^1S_0$-$^1P_1$ (461 nm), as illustrated. Furthermore, the transition $^1S_0$-$^3P_1$ (689 nm) and the transitions $^3P_j$-$^3S_1$ (679 nm, 688 nm, 707 nm) may be used to perform a state-dependent read out of data of the qubit. Furthermore, the transition $^1S_0$-$^3P_1$ (689 nm) may be used to cool the atom during a read out of data of the qubit, wherein such a cooling may improve an efficiency of the read out of data.

Figure 3A:
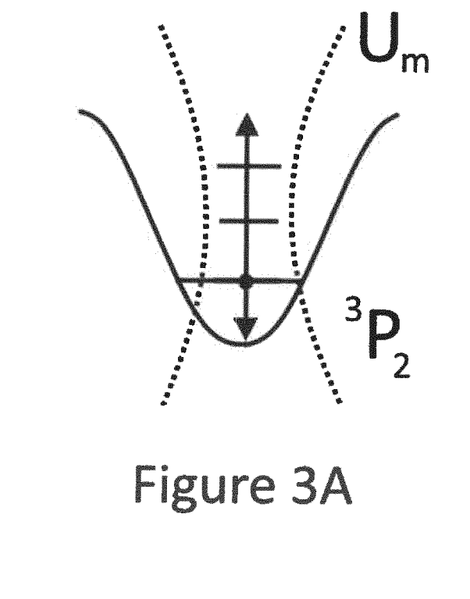
FIG. 3A to 3C: A schematic overview over trap potentials of a captured atom using an optical capture device
Figure 3B:
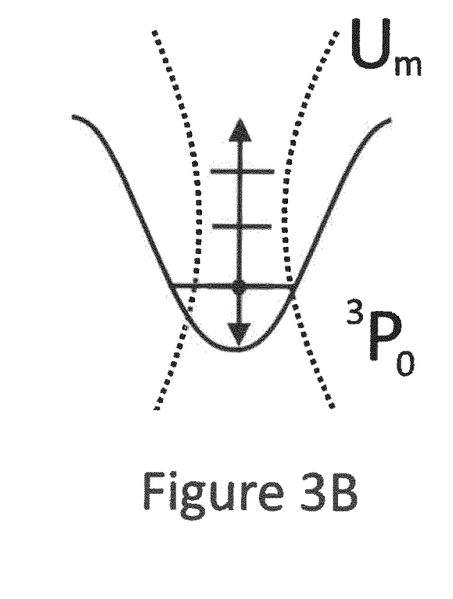
Figure 3C:
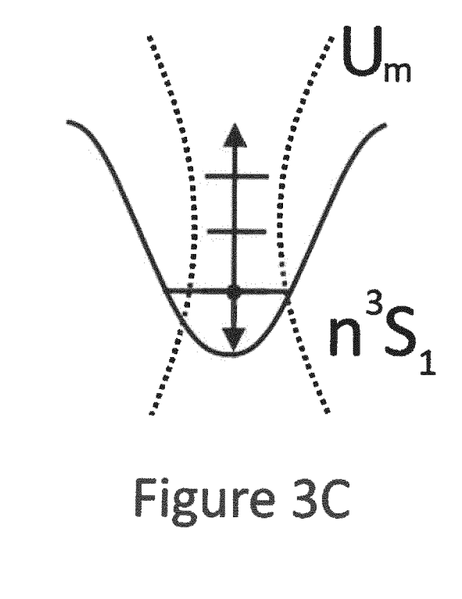

FIG. 3A to FIG. 3C show trap potentials experienced by a strontium atom when exposed to the focused laser beam emitted by the optical capture device 10. In particular, in the exemplary embodiment shown, FIG. 3A shows the trap potential experienced by $^3P_0$ electronic state, FIG. 3B shows the trap potential experienced by the $^3P_2$ electronic state, and FIG. 3C the trap potential experienced by the n $^3S_1$ (n=78) electronic state. As illustrated, each of the shown electronic states experience a substantially identical trap potential, in particular when exposed to the focused laser beam operated at the capture wavelength.

Figure 4A:
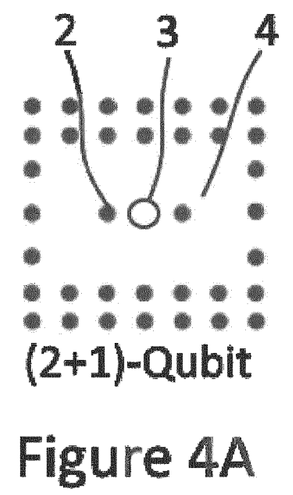
FIGS. 4A to 4C: A plurality of exemplary qubit arrangements achievable by a quantum computing device.
Figure 4B:
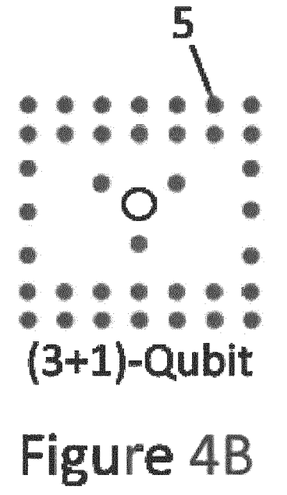
Figure 4C:
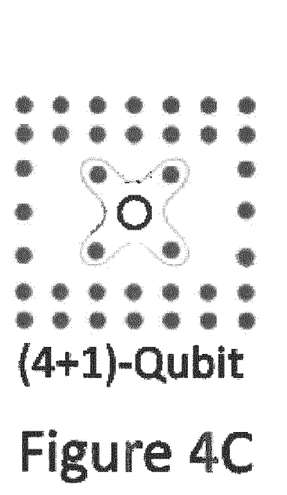

FIG. 4A to 4C show a plurality of exemplary qubit arrangements achievable by the quantum computing device 1. FIG. 4A shows a (2+1) qubit comprising two atom qubits 2 and a control qubit 3, wherein the two atom qubits 2 and the control qubit 3 are entangled (represented by entanglement 4). FIG. 4B shows a (3+1) qubit comprising three atom qubits 2 and a control qubit 3, wherein the three atom qubits 2 and the control qubit 3 are entangled (represented by entanglement 4). FIG. 4C shows a (4+1) qubit comprising four atom qubits 2 and a control qubit 3, wherein the four atom qubits 2 and the control qubit 3 are entangled (represented by entanglement 4). Non-entangled atoms 5 not forming part of the shown multi-particle qubits are positioned separate from said shown multi-particle qubits. In particular, all shown qubit arrangements in FIGS. 4A to 4C comprise symmetrically arranged qubits. Such a symmetric qubit arrangement may reduce error sources. However, asymmetrical qubit arrangements may also be possible, for example by providing different separation distances between the arranged qubits. Such asymmetrical qubit arrangements may allow for more computational flexibility, such as for example when a caused phase shift for one qubit may need to be double to a caused phase shift for another qubit.

Figure 5A:
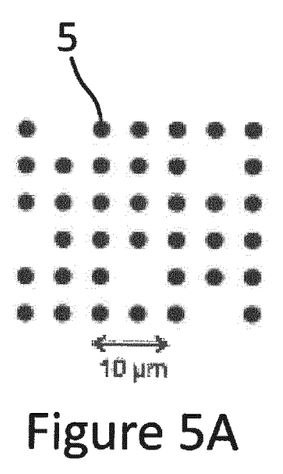
FIGS. 5A to 5B: An exemplary operation of the quantum computing device to generate a (3+1) qubit arrangement.
Figure 5B:
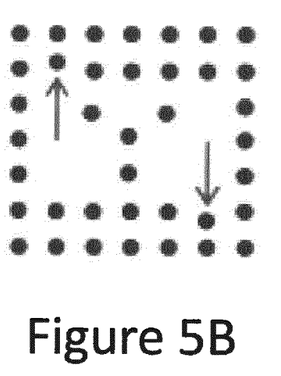
Figure 5C:
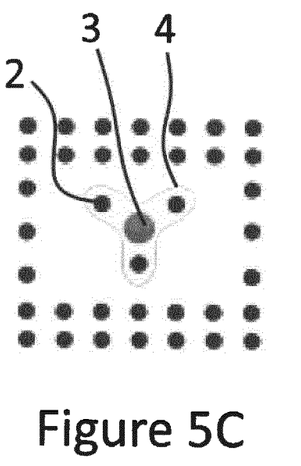

FIG. 5A to 5C show an operation of the quantum computing device to generate a (3+1) qubit arrangement. In a first step, illustrated in FIG. 5A, the quantum computing device 1 operates to capture a plurality of atoms 18 at locations of a two-dimensional array 15. In a further step, illustrated in FIG. 5B, the quantum computing device 1 operates to adjust the position of several of the captured atoms 18 within the two-dimensional array 15. In particular, the quantum computing device 1 operates to bring three atoms 18 (or atom qubits 2) into close proximity to a fourth atom 18 (or control qubit 3), which is to become a control qubit. In a third step, illustrated in FIG. 5C, the quantum computing device operates to cause entanglement between the Rydberg states of the four atoms to generate a (3+1) qubit. It is noted that the same operational principle may be applied by the quantum computing device 1 to generate a plurality of different qubits, such as for example (2+1) or (4+1) qubits. Non-entangled atoms 5 not forming part of the shown multi-particle qubit are positioned separate from said shown multi-particle qubit.

Figure 6:
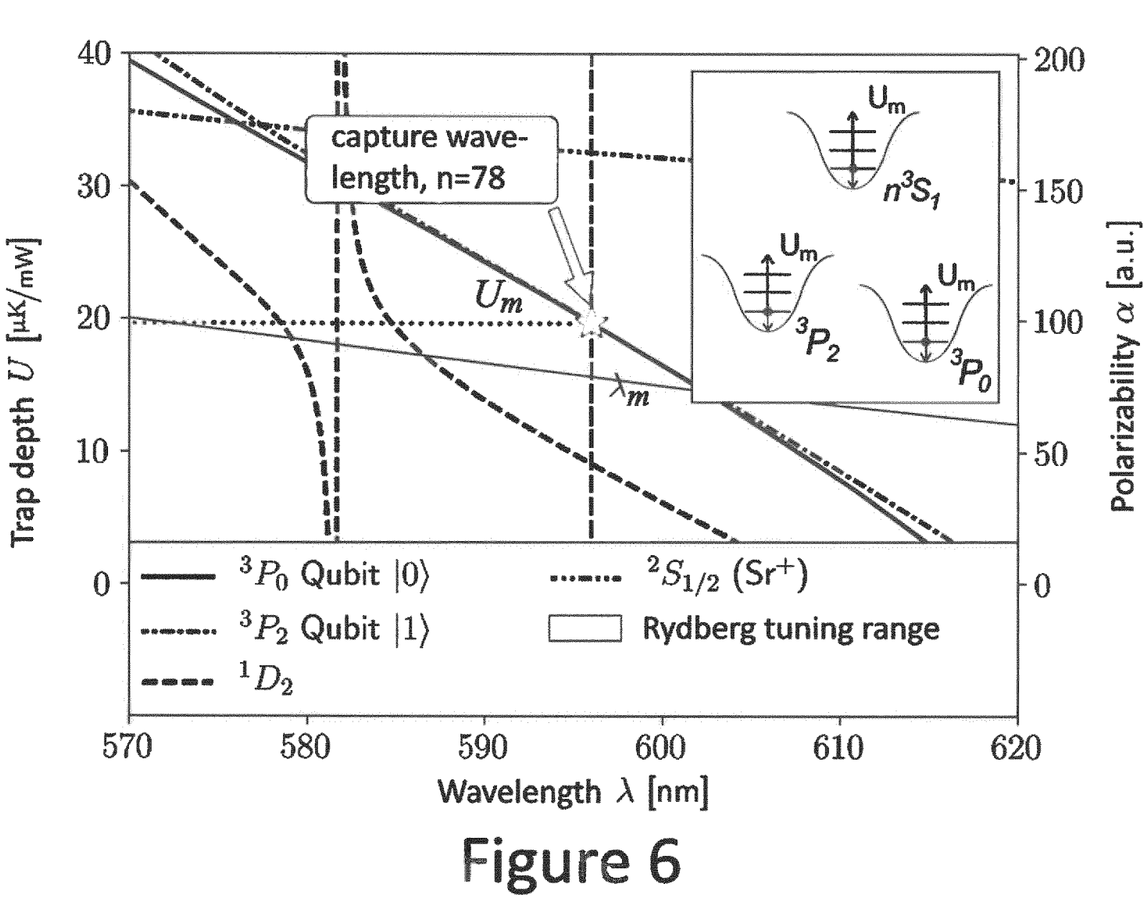
FIG. 6: A graphical representation of calculating the capture wavelength for strontium.

FIG. 6 shows a graphical representation of calculating the capture wavelength for strontium. In particular, the graph of FIG. 6 shows the polarizability of the $^3P_0$ and $^3P_2$ states as a function of wavelength. Furthermore, the graph shows the polarizability of the $^2S_{1/2}$ state of the Sr+ ion, which in part determines the polarizability of the Rydberg state, wherein a Rydberg tuning range of said state is illustrated as a section beneath said function. As can be seen, the functions of the $^3P_0$ and $^3P_2$ states intersect within the Rydberg tuning range of the $^2S_{1/2}$ state. Therefore, a suitable value of n may be calculated such that a triple intersection between the functions of the $^3P_0$, $^3P_2$, and n $^3S_1$ states is obtained, wherein said value is n=78. The triple intersection is therefore obtained for a wavelength of approx. 596 nm. Consequently, in an atom exposed to a beam with a wavelength of 596 nm, the $^3P_0$, $^3P_2$, and 78 $^3S_1$ states experience an identical trap potential generated by said beam.

A similar calculation may be undertaken for other atoms and their corresponding states.

It is understood that the embodiments described herein and/or shown in the figures are explanatory and illustrative only, and are therefore not to be interpreted as limiting the scope of the invention. In particular, a quantum computing device and/or a use of a quantum computing device and/or a method for quantum computing may comprise any combination of the features described herein and/or shown in the figures.

LIST OF REFERENCE NUMERALS

1 Quantum computing device
2 Atom qubit
3 Control qubit
4 Entanglement
5 Non-entangled atom
10 Laser light source
11 Acousto-optical deflector
12 Optical combination unit
13 Focussing optics
14 Polarization unit
15 Array
16 Vacuum cell
17 Atom reservoir
18 Atom
19 Dichroic mirror element
20 Detection unit
21 Rydberg excitation unit
22 Raman coupling unit
23 Feedback signal

The invention claimed is:

1. A quantum computing device, comprising:
    at least one atom, wherein the at least one atom has a first electronic state, a second electronic state, and a third electronic state, wherein the third electronic state is a Rydberg electronic state; and
    an optical capture device configured to emit electromagnetic radiation to capture one or more of the at least one atom,
    wherein the optical capture device is configured to emit the electromagnetic radiation at a capture wavelength, wherein the first electronic state, the second electronic state, and the Rydberg electronic state have a substantially equal AC polarizability for the capture wavelength.

2. The quantum computing device according to claim 1, wherein the first electronic state is a first fine structure electronic state, wherein the
second electronic state is a second fine structure electronic state, and, optionally,
wherein the first electronic state and the second electronic state are electronic states of the same electronic orbital.

3. The quantum computing device according to claim 1, further comprising:
a Rydberg excitation unit configured to emit at least one Rydberg excitation beam, wherein the Rydberg excitation unit is configured to emit the at least one Rydberg excitation beam at two or more captured atoms to switch an interaction therebetween on and off.

4. The quantum computing device according to claim 1, further comprising:
a Raman coupling unit, wherein the Raman coupling unit is configured to emit at least two Raman laser beams, wherein the Raman coupling unit is configured to emit the at least two Raman laser beams at the at least one captured atom.

5. The quantum computing device according to claim 1, wherein the optical capture device further comprises at least one focused laser beam unit configured to emit at least one focused laser beam, wherein the at least one focused laser beam is configured to capture the at least one atom.

6. The quantum computing device according to claim 5, wherein the at least one focused laser beam unit comprises:
a laser light source configured to emit at least one electromagnetic radiation beam,
an acousto-optical modulator array, wherein the acousto-optical modulator array comprises at least one acousto-optical modulator and/or at least one acousto-optical deflector, wherein the acousto-optical modulator array is configured to at least partially receive and diffract the at least one electromagnetic radiation beam to form at least one intermediate beam,
an optical combination unit, wherein the optical combination unit is configured to, preferentially dynamically, adjust the direction of the at least one intermediate beam,
focussing optics, wherein the focussing optics are configured to focus the at least one intermediate beam to form the at least one focused laser beam.

7. The quantum computing device according to claims 5, wherein the quantum computing device further comprises a polarization unit configured to adjust a polarization state of the at least one focused laser beam.

8. The quantum computing device according to claim 1, wherein the optical capture device is configured to capture the at least one atom at positions of a two-dimensional or three-dimensional array.

9. The quantum computing device according to claim 1, wherein the quantum computing device is configured to adjust a spatial position of the one or more captured atoms to form at least one single-qubit gate and/or at least one two-qubit gate and/or at least one multi-qubit gate, and/or
wherein the quantum computing device is configured to adjust the spatial position of the one or more captured atoms to switch between the at least one single-qubit gate and/or the at least one two-qubit gate and/or the at least one multi-qubit gate.

10. The quantum computing device according to claim 1, wherein the quantum computing device further comprises a readout unit configured to determine data of the one or more captured atoms, wherein the readout unit comprises:
at least one readout laser configured to emit at least one readout beam to cause fluorescence in the one or more captured atoms, and
a detection unit configured to observe the caused fluorescence to read out data of the one or more captured atoms.

11. The quantum computing device according to claim 1, wherein the at least one atom may comprise at least one strontium atom and/or at least one ytterbium atom; and/or
wherein the at least one atom may comprise at least one neutral atom.

12. The quantum computing device according to claim 1, wherein the quantum computing device further comprises an atom reservoir, wherein the atom reservoir comprises a plurality of the at least one atom,
wherein the atom reservoir is configured to provide the at least one atom to the optical capture device.

13. The quantum computing device according to claim 1, wherein the quantum computing device comprises:
at least one strontium atom, wherein the at least one strontium atom has a first fine structure electronic state $^3P_0$, a second fine structure electronic state $^3P_2$, and a Rydberg electronic state n $^3S_1$, wherein n has a value of 78, and
an optical capture device configured to emit at least one focused laser beam having a capture wavelength of 596 nm to capture one or more of the at least one strontium atom,
wherein the first fine structure electronic state $^3P_0$, the second fine structure electronic state $^3P_2$, and the Rydberg electronic state n $^3S_1$, wherein n has a value of 78, have a substantially equal AC polarizability for the capture wavelength of 596 nm.

14. A method for quantum computing, comprising:
providing at least one atom, wherein the at least one atom has a first electronic state, a second electronic state, and a third electronic state, wherein the third electronic state is a Rydberg electronic state; and
emitting electromagnetic radiation to capture one or more of the at least one atom, wherein the one or more atoms are captured using electromagnetic radiation at a capture wavelength,
wherein the first electronic state, the second electronic state, and the Rydberg electronic state have a substantially equal AC polarizability for the capture wavelength.

* * * * *